United States Patent [19]

Fujino et al.

[11] 4,395,779

[45] Jul. 26, 1983

[54] JAMMING WAVE REJECTING DEVICE

[75] Inventors: Teruhisa Fujino, Kawasaki; Fujio Osawa, Tama; Kenichi Chiwaki, Chiba; Sadatoshi Narazaki, Tokyo, all of Japan

[73] Assignee: Kabushiki Kaisha Koden Seisakusho, Tokyo, Japan

[21] Appl. No.: 293,642

[22] PCT Filed: Dec. 26, 1979

[86] PCT No.: PCT/JP79/00326

§ 371 Date: Aug. 12, 1981

§ 102(e) Date: Aug. 12, 1981

[87] PCT Pub. No.: WO81/01930

PCT Pub. Date: Jul. 9, 1981

[51] Int. Cl.³ .............................................. H04B 1/12
[52] U.S. Cl. .................................... 455/306; 328/167; 333/17 R; 455/307
[58] Field of Search ................. 455/63, 303, 306, 307, 455/340, 305; 334/16; 328/167; 333/17 R

[56] References Cited

U.S. PATENT DOCUMENTS

| 3,293,572 | 12/1966 | Smith | 333/17 |
| 3,562,675 | 2/1971 | Urell | 455/307 |
| 3,715,690 | 2/1973 | Young et al. | 333/17 |
| 3,787,774 | 1/1974 | Tietze et al. | 328/167 |

Primary Examiner—Marc E. Bookbinder
Attorney, Agent, or Firm—Pollock, Vande Sande & Priddy

[57] ABSTRACT

A narrow-band rejection filter inserted in a received signal path is arranged so that its rejection frequency may be changed by a control signal; the narrow-band rejection filter is controlled so that its rejection frequency may substantially coincide with the center frequency of a jamming wave; thereafter, the phase difference between signals on the input and the output side of the narrow-band rejection filter is detected; and the abovesaid narrow-band rejection filter is controlled by a signal corresponding to the phase difference so that its rejection frequency may automatically coincide with the center frequency of the jamming wave.

8 Claims, 5 Drawing Figures

JAMMING WAVE REJECTING DEVICE

TECHNICAL FIELD

This invention relates to a jamming wave rejecting device for rejecting jamming waves of a single frequency present in a receiving frequency band or in its vicinity in a receiver of a relatively wide receiving frequency band.

BACKGROUND ART

For example, in a Loran C receiver, electric waves of a Decca navigation system (hereinafter referred to as the Decca electric wave) may sometimes lie in the vicinity of its receiving frequency band. For rejecting this Decca electric wave, a narrow-band rejection filter, which is what is called a notch filter, is employed. A vessel loaded with the Loran C receiver sails passing through areas of Decca electric waves of different frequencies, so that when it enters an area in which the frequency of the Decca electric wave jamming reception differs from that in the previous area, it is necessary to adjust the center frequency of the abovesaid narrow-band rejection filter to accurately set it to the jamming wave. Since the rejection filter is to reject the jamming wave in the vicinity of the receiving band or in the receiving band, its rejection band designed to be narrow; accordingly, the operation of adjusting its center frequency to the frequency of the jamming wave is very difficult and much time and skill are required for the adjustment; in addition, even if this adjustment contains a slight deviation, the presence of this rejection filter rather rejects a portion of the signal component desired to receive and the jamming wave rejecting effect extremely lessens, making it impossible to achieve the desired object. The jamming wave to the Loran C receiver, the Decca electric wave in general, may sometimes exist not only at one frequency but also at a plurality of frequencies and it was very troublesome to adjust the center frequency of the narrow-band rejection filter for each of them. In ordinary receivers as well as in the Loran C receiver, the adjustment for rejecting the jamming wave by a narrow-band rejection filter was very cumbersome and demanded time and skill.

An object of this invention is to provide a jamming wave rejecting device which is designed so that when the frequency of a narrow-band rejection filter is brought to the neighborhood of the jamming wave to be rejected, the center frequency of the narrow-band rejection filter automatically and accurately coincides with the frequency of the jamming wave, thus enabling rejection of the jamming wave easily and accurately.

DISCLOSURE OF THE INVENTION

According to this invention, the narrow-band rejection filter is arranged so that its rejection center frequency may be controlled by a control signal; signals on the input and output sides of the narrow-band rejection filter are taken out utilizing the general property of the narrow-band rejection filter that the phase of its output corresponding to the input signal becomes a leading phase or a lagging phase with respect to the input signal depending upon whether the frequency of the input signal is above or below the center frequency of the filter; the phase difference between the signals taken out is detected; and the center frequency of the narrow-band rejection filter is controlled by the detected output so that the center frequency may automatically coincide with the frequency of the jamming wave accurately. In this case, since a linear portion of the phase characteristic of the narrow-band rejection filter is very narrow, the output from the narrow-band rejection filter is provided via a band-pass filter to an indicator and the pass center frequency of the band-pass filter is controlled by a control signal so that the indicator may indicate a maximum value, that is, the pass center frequency of the band-pass filter may substantially coincide with the center frequency of the jamming wave. By the control signal at that time is controlled the rejection center frequency of the narrow-band rejection filter. In this case, the same control characteristic is used for the both filters, by which the center frequency of the band-pass filter for supplying its output to the indicator is brought into agreement with the rejection center frequency of the narrow-band rejection filter. Thereafter it is sufficient to change over the control input to the narrow-band rejection filter so that the rejection center frequency of the narrow-band rejection filter may be controlled by the output from the aforesaid comparator.

In the case where a plurality of jamming waves exist, narrow-band rejection filters are provided respectively corresponding to the jamming waves and these filters are connected in series. These narrow-band rejection filters are selected by a selector and the input and output sides of the selected filter are switchingly connected to first and second common band-pass filters and the outputs from the common band-pass filters are compared in a phase comparator. The output from this phase comparator is selected by a selector and applied to a control terminal of the narrow-band rejection filter selected at that time. Also in this case, prior to the application of the output from the phase comparator to the control terminal, a control signal from a control signal generator is applied via the selector to the control terminal of the selected narrow-band rejection filter, whereby its rejection center frequency is caused to coincide with the center frequency of the jamming wave. Further, the control signal for each narrow-band rejection filter is held in the corresponding holder circuit. In this way, the arrangement for pulling the center frequency of a narrow-band rejection filter in the center frequency of the jamming wave is used in common to a plurality of narrow-band rejection filters.

The control signal is automatically varied in a fixed direction to change the center rejection frequency of a narrow-band rejection filter in a fixed direction; the signal levels at the input and output sides of the narrow-band rejection filter are compared by a level comparator; from the fact that the level difference exceeds a predetermined value, it is detected that the center frequency of the abovementioned narrow-band rejection filter is substantially in agreement with the center frequency of a jamming wave; and, by the detected output, the output from the phase comparator is applied as a control signal to the narrow-band rejection filter. In this way, operations for bringing the center frequency of the narrow-band rejection filter into agreement with the center frequency of the jamming wave are all performed automatically. Also in this case, the automatic operation for the frequency adjustment can be used in common to a plurality of narrow-band rejection filters. Further, it is possible to omit the operation by which a control signal in the case of the center frequency of the narrow-band rejection filter being substantially coincident with the frequency of the jamming wave is stored in a memory and, when the receiver is used again, the stored control signal is detected and supplied to the narrow-band rejection filter to adjust the center frequency of the narrow-band rejection filter to be substantially coincident with the center frequency of the jamming wave.

BEST EMBODIMENTS FOR THE PRACTICE OF THE INVENTION

Figure 1:
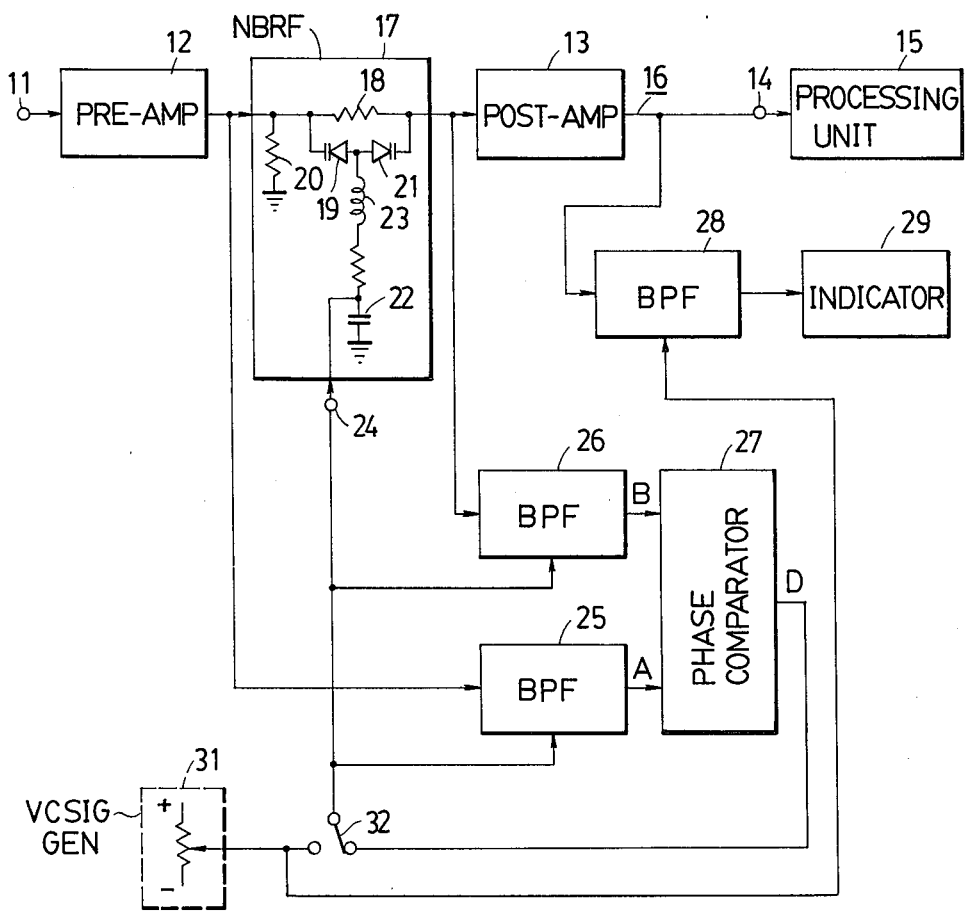
FIG. 1 is a block diagram illustrating an example of the jamming wave rejecting device of this invention.

FIG. 1 shows an example of the jamming wave rejecting device of this invention. A received signal is supplied from an input terminal 11 to a processing unit 15 such as, for example, a received Loran C signal processing unit, via a pre-amplifier 12, a post-amplifier 13 and a receiving output terminal 14. A Loran C receiver is set forth, for example, in U.S. Pat. No. 3,868,691 Gazette published on Feb. 25, 1975. A narrow-band rejection filter 17 is inserted in series in a received signal path 16 between the input terminal 11 and the output terminal 14. In this example, the narrow-band rejection filter 17 is inserted between the pre-amplifier 12 and the post-amplifier 13. The narrow-band rejection filter 17 is a filter whose rejection center frequency is varied by a control signal and it comprises, for example, a resistor 18 inserted in series, variable capacitance diodes 19 and 21 connected in parallel therewith but opposite in polarity and in series to each other, and a series circuit of a DC blocking capacitor 22 and an inductance element 23 connected between the connection point of the variable capacitance diodes 19 and 21 and the grounding point. The connection point of the variable capacitance diodes 19 and 21 is used as a control signal input terminal 24 and, by applying thereto a DC voltage, the rejection center frequency is altered. At that time, one of the input and output sides of the filter 17, is this example, the input side is grounded via a resistor, 20, by which a voltage correctly corresponding to the control signal voltage fed to the terminal 24 is applied to the diodes 19 and 21.

In this invention the input and output sides of the narrow-band rejection filter 17 are branched to band-pass filters 25 and 26, respectively. It is preferred that these band-pass filters 25 and 26 have the same characteristics and reject signals of other frequencies than the center frequency of the narrow-band rejection filter 17. The filtered output signals of the band-pass filters 25 and 26 are phase-compared by a phase comparator 27. On the other hand, the following stage of the narrow-band rejection filter 17, in this example, the output side of the post-amplifer 13 is connected to a band-pass filter 28. The output from the band-pass filter 28 is applied to an indicator 29 for indication of its intensity.

The band-pass filter 28 is a filter whose center frequency can be controlled by a control signal and, this can also be produced by forming, for example, a portion of its filter component by a variable capacitance diode. In this case, the band-pass filter 28 and the narrow-band rejection filter 17 are selected to have such control characteristics that their center frequencies may coincide with each other with the same control signal. Further, a variable control signal generator 31 is provided for applying control signals to those filters. The output from the control signal generator 31 is supplied to the band-pass filter 28 and, further, the output from the control signal generator 31 and the output from the phase comparator 27 are changed over by a switch 32 to be applied as a control signal to the narrow-band rejection filter 17. In this example, the band-pass filters 25 and 26 are also arranged so that the center frequencies of their pass bands are controlled by the control signal from the control signal generator 31 and the movable contact side of the switch 32 is connected not only to the control terminal 24 for the narrow-band rejection filter 17 but also to frequency control terminals for the band-pass filters 25 and 26. The control characteristics for these filters 17, 25 and 26 are selected so that the center frequencies of the filters 17, 25 and 26 may be controlled by the same control signal to be equal.

Figure 2:
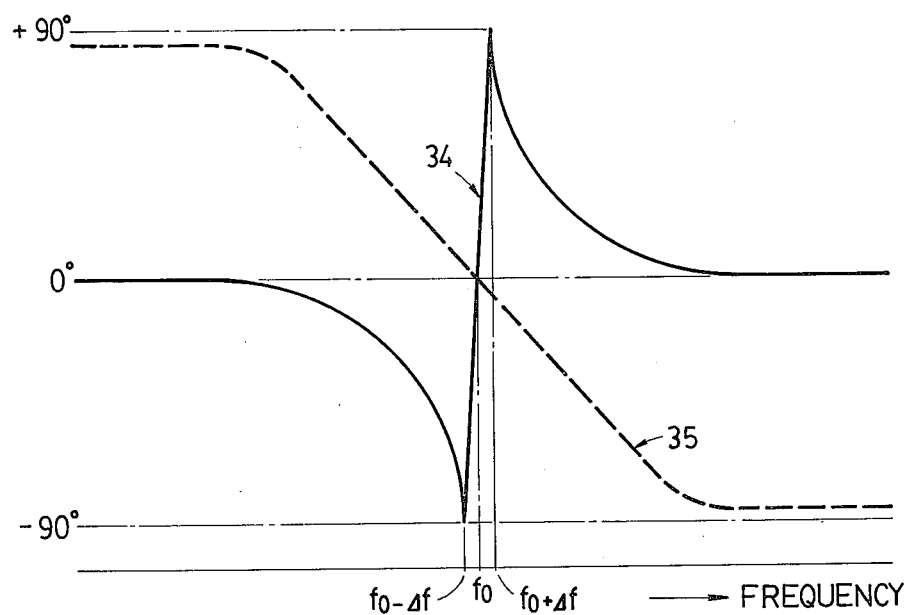
FIG. 2 is a graph showing the phase-frequency characteristics of a narrow-band rejection filter 17 and band-pass filters 25 and 26.

The phase-frequency characteristic of the narrow-band rejection filter 17 is such as indicated by a curve 34 in FIG. 2, in which the phase lags 90° for frequencies lower than the rejection center frequency $f_0$ and leads 90° for higher frequencies; namely, the phase characteristic undergoes abrupt changes about the center frequency $f_0$ and the state phase 0 is gradually approached on either side outside of the range of sudden changes, $f_0 - \Delta f$ to $f_0 + \Delta f$. The filter 17 is such a phase cancelling type filter. On the other hand, the band-pass filters 25, 26 and 28 are each formed, for example, by a single-humped tuning circuit comprising a capacitor and a coil, and its phase-frequency characteristic is such as indicated by a curve 35 in FIG. 2 in which the pass center frequency is $f_0$ and the phase advances at lower frequencies and delays at higher ones; namely, the phase gradually changes as the frequency becomes lower or higher than the center frequency.

In FIG. 1 the switch 32 is connected to the side of the control signal generator 31 and the output from the control signal generator 31 is adjusted so that the indicator 28 may indicate a maximum, that is, the center frequency of the band-pass filter 28 may substantially coincide with the frequency of jamming waves. This adjustment can easily be effected since the pass band width of the band-pass filter 28 is appreciably wide as compared with the rejection band width of the narrow-band rejection filter 17. In this way, the filters 17 and 28 are controlled so that the center frequency of the jamming waves may lie within the range $f_0 \pm \Delta f$ in which the phase variation of the narrow-band rejection filter 17 is substantially linear in FIG. 2.

Figure 3:
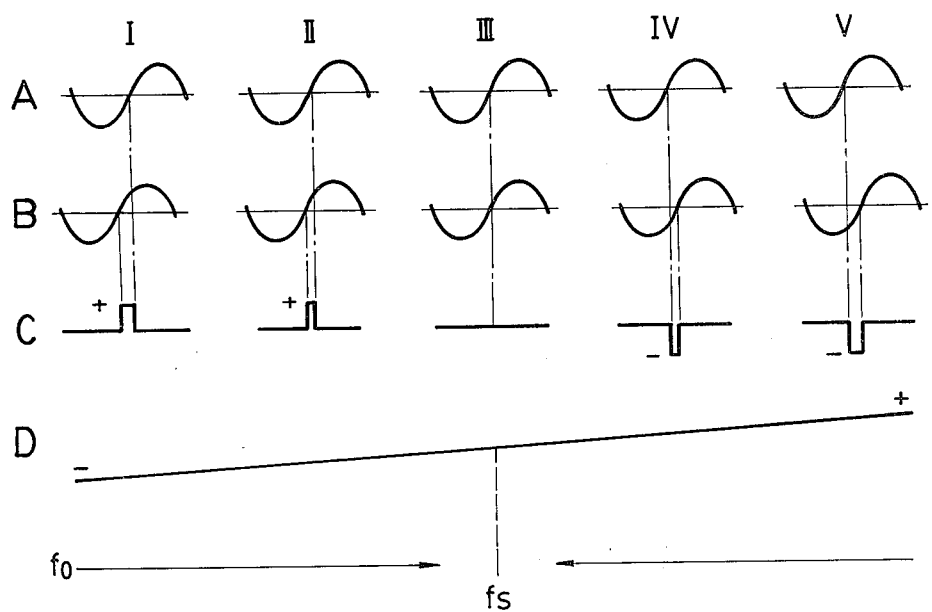
FIG. 3 is a waveform diagram explanatory of the operation of FIG. 1.

Thereafter the switch 32 is connected to the side of the phase comparator 27. Now, let output waveforms of the band-pass filters 25 and 26 be represented by A and B and consider a phase difference of the output waveform B of the filter 26 relative to the output waveform A of the filter 25. In the case where the center frequency $f_0$ of the narrow-band rejection filter 17 is lower than the frequency $f_s$ of the jamming wave, the waveform B on the output side of the narrow-band rejection filter 17 leads the waveform A on the input side thereof, as shown in FIG. 3I, and in the phase comparator 27 is detected a pulse of the polarity and the width corresponding to the phase difference, as depicted in FIG. 3C. In the phase comparator 27 there are provided an integration circuit by which the pulse signal corresponding to the detected phase difference, shown in FIG. 3C, is converted into a voltage and, if necessary, an inverter-amplifier circuit, thereby outputting a voltage of the magnitude and the polarity corresponding to the phase difference. By this output the center frequencies of the narrow-band rejection filter 17 and the band-pass rejection filter 17 and the band-pass filters 25 and 26 are controlled. As a result of this, the center frequency $f_0$ of the narrow-band rejection filter 17 approaches the frequency $f_s$ of the jamming wave and consequently the phase difference between the waveforms A and B also becomes small as depicted in FIG. 3II and the pulse representing the phase difference also becomes narrow as shown in C of FIG. 3II, resulting in the control voltage from the phase comparator 27 also undergoing gradual changes. In this way, the phase difference between the signal waveforms A and B available from the stages preceding and succeeding the narrow-band rejection filter 17 is reduced to zero as depicted in FIG. 3III. At this time, the center frequency $f_0$ coincides with the center frequency $f_s$ of the jamming wave.

In the case where the center frequency $f_0$ of the narrow-band rejection filter 17 is higher than the center frequency $f_s$ of the jamming wave, the waveform B on the output side of the narrow-band rejection filter 17 lags the waveform A on the input side thereof as shown in FIG. 3V and in the phase comparator 27 a pulse of the width corresponding to the phase difference is obtained in the polarity reverse from that in the case of FIG. 3I. Accordingly, the control signal based on it acts to lower the center frequency $f_0$ of the narrow-band rejection filter 17. That is, when the center frequency $f_0$ of the narrow-band rejection filter 17 varies from a lower frequency than the center frequency $f_s$ of the jamming wave to a higher frequency, the phase comparator 27 generates such a control signal as shown in FIG. 3D which undergoes a linear variation, and the center frequency $f_0$ automatically approaches the frequency $f_s$ of the jamming wave.

As described above, according to the jamming wave rejecting device of this invention, the center frequency $f_0$ of the narrow-band rejection filter 17 is automatically brought into agreement with the center frequency $f_s$ of the jamming wave by controlling the center frequency of the band-pass filter 28 to adjust it substantially to the center frequency of the jamming wave and then changing over the switch 32 to the output side of the phase comparator 27. Accordingly, it is possible to accurately remove the jamming wave.

Figure 4:
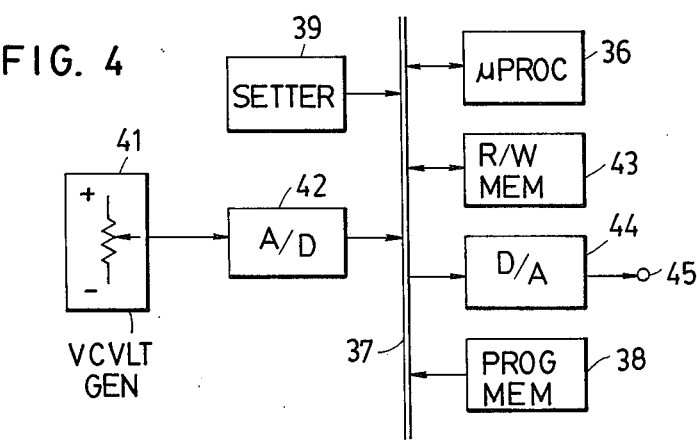
FIG. 4 is a block diagram illustrating another example of a control signal generator.

Since the jamming wave is thus removed, the center frequency of the narrow-band rejection filter 17 can easily be controlled and, in order to retain the center frequency, the control signal generator 31 can be arranged as follows: Namely, for example, as shown in FIG. 4, a microprocessor 36 is connected to a bus 37 and the microprocessor 36 reads out, interprets and executes a program loaded in a program memory 38 to perform desired processing; for example, in the case where there are a plurality of jamming waves, numbers are given to the jamming waves and one of the numbers is specified by a setter 39. In this state a variable control voltage generating circuit 41 is controlled to generate an analog control signal, which is converted by an AD converter 42 into a digital signal and this digital signal is stored in a readable/writable memory 43 and read out from the memory 43 and then converted by a DA converter 44 into an analog signal, which is applied as a control signal from a terminal 45 to control signal terminals of the filters 17, 25, 26 and 28 in FIG. 1. By controlling the control signal generating circuit 41, a desired state is obtained, that is, a state in which the intensity of the output from the band-pass filter 28 is maximum and its center frequency is substantially in agreement with the center frequency of the jamming frequency, as described previously in respect of FIG. 1. The value of the control signal at that time is stored in the memory at an address corresponding to the number specified by the setter 39. In a similar manner, the numbers of the other jamming waves are also specified by the setter 39 and respectively stored in the memory 43 at the corresponding addresses. By this, at least the stored contents of the memory 43 are retained even in the state in which the power source of the device is cut off; in the case of operating the receiver again, if the number corresponding to the jamming wave desired to reject is set by the setter 39, the control signal for the jamming wave stored in the memory 43 is automatically provided to cause the center frequency of the narrow-band rejection filter 17 to substantially coincide with the center frequency of the jamming wave, after which if the switch 32 is changed over to the side of the phase comparator 27 as referred to previously, the center frequency $f_0$ is automatically pulled in the frequency $f_s$ of the jamming wave accurately by a pull-in operation. Once the control signal corresponding to each jamming wave has been stored in the memory 43, it is sufficient to effect re-setting by the setter 39 when a vehicle has moved into an area where jamming waves are different from those in the preceding area; namely; there is no need of bringing the center frequencies into agreement with each other by adjusting the control signal generating circuit 41, and hence the jamming wave desired to reject can accurately be removed with much ease. If the control signal at the time of the center frequency of the jamming wave being in agreement with the center frequency of the narrow-band rejection filter 17 is preknown, it is also possible to adjust the frequency of the narrow-band rejection filter by prestoring the control signal in the memory 43 and reading it out from the memory 43 based on the setting of the setter 39 without performing the setting by the adjustment of the control circuit 41. For example, a Loran C receiver employs a microprocessor for the time difference measurement thereof, so that the microprocessor may be used for the purpose described above and consequently there is no need of specifically providing a microprocessor for the rejection of jamming waves.

Figure 5:
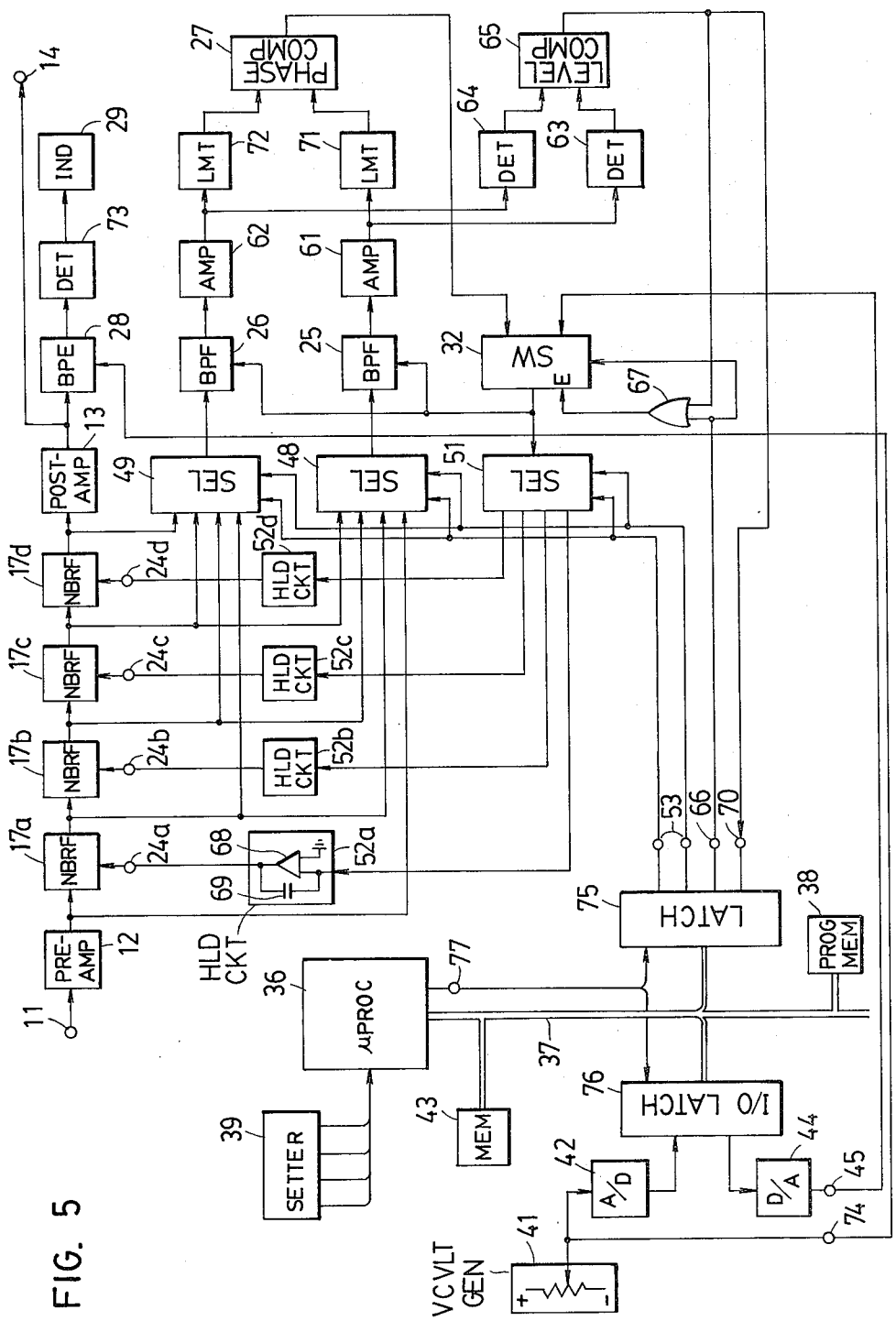
FIG. 5 is a block diagram illustrating an example of the jamming wave rejecting device of this invention which is adapted to automatically control a plurality of narrow-band rejection filters.

In the above, one narrow-band rejection filter 17 is provided in the signal path 16 and its center frequency is adjusted to the center frequency of one jamming wave but, in the case of plural jamming waves, narrow-band rejection filters are provided respectively corresponding to the jamming waves. In this case, a common circuit can be employed for adjusting their center frequencies. For example, as depicted in FIG. 5, four narrow-band rejection filters 17a to 17d are inserted in series between the pre-amplifier 12 and the post-amplifier 13 and the input sides of these filters 17a to 17d are selectively connected to the band-pass filter 25 via a selector 48 which is constituted by an analog multiplexer. Similarly, the output sides of the narrow-band rejection filters 17a to 17d are selectively connected to the band-pass filter 26 via a selector 49 which is formed by an analog multiplexer. Respective output sides of e a selector 51 which is formed by an analog multiplexer are connected via hold circuits 52a to 52d to control input terminals 24a to 24d for the narrow-band rejection filters 17a to 17d. The output side of the switch 32 is connected to the input side of the selector 51. To the selectors 48, 49 and 51 is applied, as a control signal, filter specifying signal from the microprocessor 36 via terminals 53 and the input and output sides of one of the narrow-band rejection filters depending on the corresponding jamming wave are respectively connected to the band-pass filters 25 and 26 and, further, its control terminal is connected to the outside of the switch 32. This example shows the case where the center frequencies of the filters 17a to 17d are fully automatically brought into agreement with the center frequencies of the corresponding jamming waves without involving control by manual adjustment using the band-pass filter 28. For this purpose, the outputs from the band-pass filters 25 and 26, that is, in FIG. 5, their amplified outputs from amplifiers 61 and 62, are provided to detectors 63 and 64, respectively, and the detected outputs therefrom are compared by a level comparator 65. When the center frequency of the narrow-band rejection filter selected by the selectors 48 and 49 appreciably deviates from the center frequency of the jamming wave, the jamming wave passes through the selected narrow-band rejection filter with substantially no attenuation and the output levels of the detectors 63 and 64 are nearly equal to each other and the output from the level comparator 65 is low-level. When the center frequency of the selected narrow-band rejection filter has substantially coincided with the center frequency of the jamming wave, the signal level at the output side of the narrow-band rejection filter becomes appreciably smaller than the signal at the input side thereof and the output from the level comparator 65 becomes high-level. The output from the level comparator 65 is inputted via a terminal 70 to the microprocessor 36.

A switching signal, which is applied from the microprocessor 36 to a terminal 66, is directly provided as a switching command to the analog switch 32 and, at the same time, this switching signal and the output from the level comparator 65 are applied via an OR circuit 67 to an enable terminal E of the analog switch 32. The switch 32 connects the terminal 45 to the selector 51 when the switching command applied to the switch is high-level, and connects the output side of the phase comparator 27 to the selector 51 when the command is low level. The hold circuits 52a to 52d are each composed of an operational amplifier 68 and a hold capacitor 69 connected between the input and output sides thereof, as shown, for example, by the circuit 52a. Though not depicted in FIG. 1, the outputs from the band-pass filters 25 and 26 are provided to the phase comparator 27 via the amplifier 61 and an amplitude limiter 71 and via the amplifier 62 and an amplitude limiter 72, respectively. Further, the output from the band-pass filter 28 is detected by a detector 73 and then applied to the indicator 29. As a control signal for the band-pass filter 28, the output of the control circuit 41 is supplied via a terminal 74. The filter specifying signal at the terminal 53, the switching signal at the terminal 66 and the output from the comparator 65 at the terminal 70 are respectively inputted to and outputted from the microprocessor 36 via a two-way latch circuit 75. The output from the AD converter 42 and the input to the DA converter 44 are inputted to and outputted from the microprocessor 36 via an input/output latch circuit 76. The input/output latch circuits 75 and 76 are selected by a chip select command from a terminal 77 of the microprocessor 36.

In the memory 43 there are stored, for each narrow-band rejection filter, a control signal and a flag indicating whether the signal is valid or not. Let it be assumed that the receiving band of the Loran C receiver is 90 to 110 KHz and that two jamming waves lower than the center frequency 100 KHz are rejected by the narrow-band rejection filters 17a and 17b and that two jamming waves higher than 100 KHz are rejected by the narrow-band rejection filters 17c and 17d. When the power source switch is turned ON, the microprocessor 36 specifies first the narrow-band rejection filter 17a and reads out its control signal and the flag indicating whether the signal is valid or not. In the case where the flag indicating the signal is valid or not is not valid, that is, where it is "0", the terminal 66 is made high-level and the control signal is retained as an analog signal in the hold circuit 52a via the DA converter 44 and the analog switch 32, and applied to the control terminal 24a of the filter 17a. In the initial state the control signal may be used as a signal, for example, for 100 KHz in connection with each of the filters 17a to 17d, and it is also possible that a signal for a frequency spaced a predetermined value from the abovesaid frequency is predetermined for each of the filters 17a to 17d. Upon each selection of the narrow-band rejection filter, the control signal is provided as referred to previously and thereafter the output from the level comparator 65 is read out; in the case where it is low-level, a constant value is added to (or reduced from) the control signal at that time so that the center frequency of the filter 17a decreases by a fixed value and this control signal is stored in the memory 43 at the address corresponding to the filter 17a and the flag is held "0". Next, the filter 17b is selected and the same operations as described above are performed, after which the filters 17c and 17d are selected one after the other and the abovesaid operations take place. In connection with each of the filters 17c and 17d, however, such a signal that raises the center frequency of the filter by a fixed value is subtracted from (or added to) the control signal. Thereafter, the sequential selection of the filters is repeated starting with the filter 17a. In this way, the center frequencies of the filters 17a to 17d are sequentially shifted and, for example, in the case of the filter 17a being selected, if its center frequency substantially coincides with the center frequency of the corresponding jamming wave, the output from the level comparator 65 becomes high-level. This high level is read in the processor 36 and the processor 36 keeps the control signal for the filter 17a as it is and, in order to indicate that it is valid, the flag is rewritten to "1". In consequence, when the filter 17a and is selected next, the terminal 66 is given a low level and the switch 32 supplies the output from the phase comparator 27 to the selector 51 and accordingly automatic frequency pull-in to the filter 17a is performed. Moreover, at this time the output from the comparator 65 is high-level, effectively providing the output from the analog switch 32. In this way, any of the filters 17a to 17d is automatically controlled so that when it is selected, the output from the level comparator 65 may become high-level. When all the outputs become high-level, it means that the rejection center frequencies of the narrow-band rejection filters 17a to 17d correctly coincide with the center frequencies of the corresponding jamming waves, respectively. With such an arrangement that the microprocessor 36 continues the abovesaid operation thereafter, when the rejection frequency of the narrow-band rejection filter deviates from the center frequency of the jamming wave by some cause, for example, when the output from the level comparator 65 is detected to be low-level in succession a predetermined number of times in connection with one filter, the microprocessor 36 rewrites the aforesaid flag for the filter to "0", by which the frequency adjustment is automatically conducted again. In the case of varying the center frequency of the filter by a fixed value each time, the control circuit 41, the AD converter 42, the band-pass filter 28, the detector 73 and the indicator 29 may be dispensed with. When the freqency band of the jamming wave can be anticipated, the jamming wave can be quickly removed by sweeping only the region of the anticipated frequency band. Moreover, if the receiving signal wave is not received temporarily because it is an intermittent wave or for some other reasons in the state in which the rejection frequency of the narrow-band rejection filter, for example, 17a is in agreement with the center frequency of the corresponding jamming wave, then there is the fear that when the filter 17a is selected in the state in which the received wave is OFF, the output from the phase comparator 27 at that time responds to a noise and greatly differs from that in a normal case. In such a case, however, the output from the level comparator 65 becomes low-level and no output is provided from the analog switch 32, so that there is no fear of the rejection frequency of the narrow-band rejection filter being shifted by a temporary cut-off of the receiving signal.

As described with respect to FIG. 4, it is also possible that when re-activating the receiver after specifying the filters 17a to 17d by the setter 39, manually controlling the control circuit 41, storing the control signals for the filters 17a to 17d in the memory 43 and stopping the operation of the receiver, the control signals stored in the memory 43 are selectively supplied by the microprocessor 36 to the corresponding ones of the filters 17a to 17d.

We claim:

1. A jamming wave rejecting device comprising a narrow-band rejection filter which is inserted in series in a received signal path and the rejection frequency of which is varied by a control signal; first and second band-pass filters which are connected to the input and outout sides of the narrow-band rejection filter, respectively, and which have pass center frequencies substantially equal to the rejection frequency of the narrow-band rejection filter and have substantially the same filter characteristic; a phase comparator for detecting the phase difference between the outputs from the first and second band-pass filters; a variable control signal generator for generating a control signal; a third band-pass filter which is connected to the output side of the abovesaid narrow-band rejection filter and the pass center frequency of which is controlled by the control signal from the abovesaid control signal generator; an indicator which is connected to the output side of the third band-pass filter for displaying the intensity of the output therefrom; and a change-over switch which changes over the output from the abovesaid phase comparator and the output from the abovesaid control signal generator and applies one of them as the control signal to the abovesaid narrow-band rejection filter.

2. A jamming wave rejecting device as recited in claim 1 wherein the abovesaid first and second band-pass filters are each arranged so that the pass center frequency is controlled by the narrow-band rejection filter control signal, the center frequency-control voltage characteristics of said first and second band-pass filters being selected to be substantially equal to the center frequency-control voltage characteristic of the abovesaid narrow-band rejection filter and being controlled by the same control signal as that for the abovesaid narrow-band rejection filter.

3. A jamming wave rejecting device as recited in claim 1 or 2 in which said narrow-band rejection filter comprises a plurality of narrow-band rejection filters in series, said device further comprises first and second selectors for selectively connecting the input and output sides of the plurality of narrow-band rejection filters to the abovesaid first and second band-pass filters, respectively; a third selector for selectively connecting the output side of the abovesaid change-over switch to hold circuits respectively connected to control terminals of the abovesaid plurality of the narrow-band rejection filters for holding controls signals therefor; select signal generating means for applying one of a plurality of filter select signals, each corresponding to respective rejection filters commonly to the abovesaid first, second and third selectors a memory coupled to the variable control signal generator and which stores control signals corresponding to said plurality of narrow-band rejection filters when the center frequencies of the narrow-band rejection filters corresponding to the control signals from the abovesaid variable control signal generator are substantially in agreement with the center frequencies of corresponding jamming waves; and means for reading out the abovesaid control signals stored in the abovesaid memory corresponding to reflective select signals and supplying them to the abovesaid change-over switch.

4. A jamming wave rejecting device as recited in claim 3 which includes control means, for automatically generating in succession the abovesaid select signals for the abovesaid narrow-band rejection filters and reading out from the abovesaid memory the control signals corresponding to the select signals.

5. A jamming wave rejecting device comprising a narrow-band rejection filter which is inserted in series in a received signal path and the rejection frequency of which is varied by a control signal; first and second band-pass filters which are connected to the input and output sides of the narrow-band rejection filter, respectively, and the pass center frequencies of which are substantially equal to the rejection frequency of the narrow-band rejection filter and are controlled by the abovesaid control signal and which have substantially the same filter characteristic; a phase comparator for detecting the phase difference between the outputs from the first and second band-pass filters; a level comparator for detecting the difference between the output levels of the abovesaid first and second band-pass filters; a variable control signal generator for generating a control signal which automatically varies to sequentially change the rejection frequency of the abovesaid narrow-band rejection filter; and a change-over switch which is controlled by the output from the abovesaid level comparator to supply to a control terminal of each of the narrow-band rejection filter and the first and second band-pass filters with the output from the abovesaid variable control signal generator when the abovesaid level difference is less than a predetermined value and the output from the phase comparator when the abovesaid level difference is larger than the predetermined value.

6. A jamming wave rejecting device as recited in claim 5 in which said narrow-band rejection filter comprises a plurality of narrow-band rejection filters in series, said device further comprising first and second selectors for selectively connecting the input and output sides of the plurality of narrow-band rejection filters to the abovesaid first and second band-pass filters, respectively; a third selector for selectively connecting the output side of the abovesaid change-over switch to hold circuits respectively connected to control terminals of the abovesaid plurality of narrow-band rejection filters for holding control signals therefor; a memory for storing the control signal for each of the abovesaid narrow-band rejection filters and a flag for indicating whether the control signal is valid or not; and control means which applies one of a plurality of filter select signals, each corresponding to respective rejection filters commonly to the abovesaid first, second and third selectors, reads out from the abovesaid memory the control signal and the flag for the narrow-band rejection filter selected by the filter select signal to control the abovesaid changeover switch in accordance with the flag, selects one of the abovesaid read-out control signals and the output from the phase comparator, inputs the output signal of the level comparator and, when the output signal from the level comparator is larger than a predetermined value, rewrites the abovesaid flag to indicate that the control signal is valid.

7. A jamming wave rejecting device as recited in claim 6 which includes an OR circuit for ORing a switching signal to the abovesaid change-over switch and the output from the abovesaid level comparator to control the abovesaid change-over switch to be in its operative or inoperative condition.

8. A jamming wave rejecting device as recited in claim 7 wherein said control means includes means for rewriting the abovesaid flag to a state indicating that the control signal is invalid when it is successively detected a plurality of times in connection with the same filter that the output from the abovesaid level comparator is smaller than a predetermined value.

* * * * *